June 2, 1936.                B. D. KUNKLE                2,042,666
MOTOR MOUNT
Filed Aug. 22, 1934
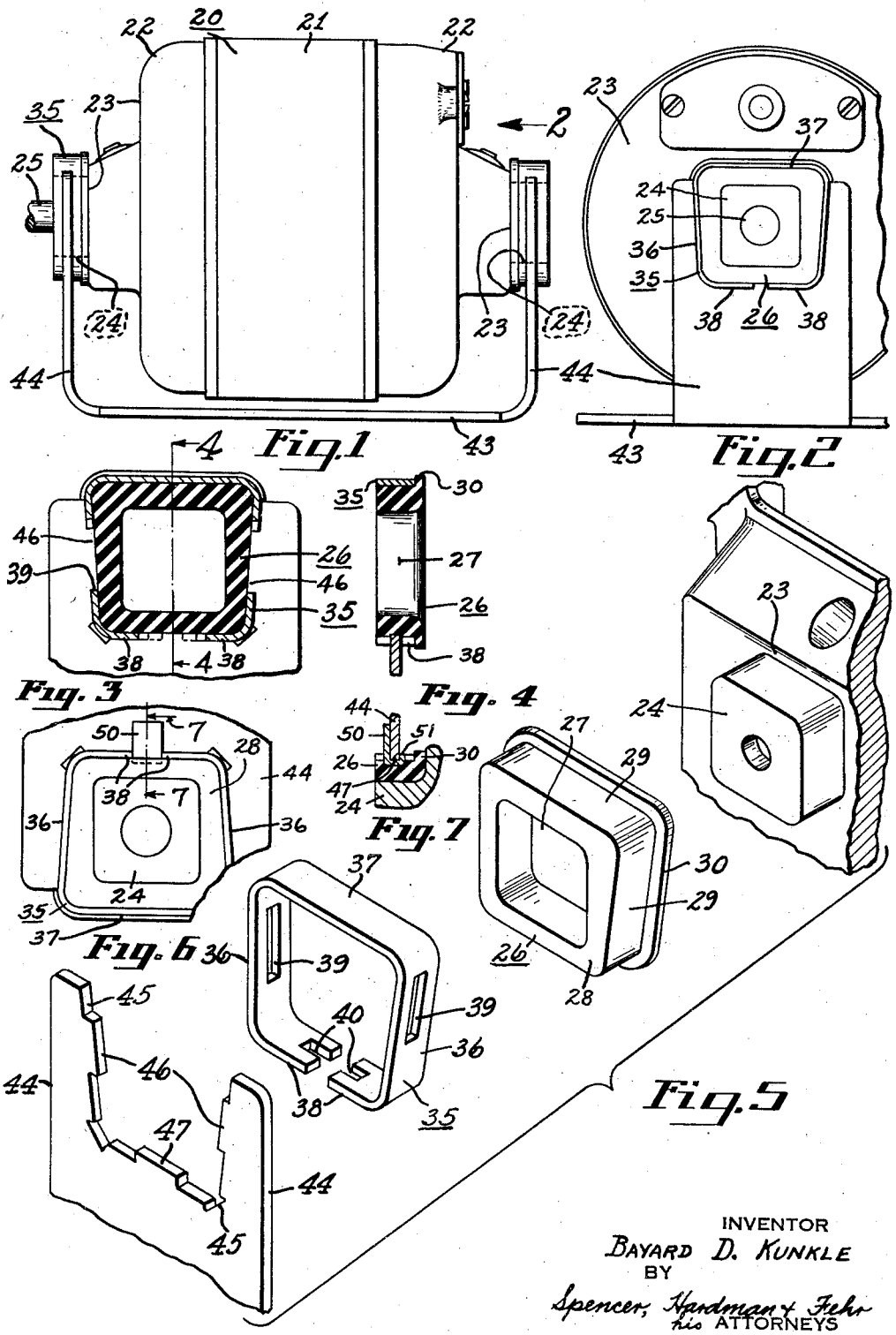
INVENTOR
BAYARD D. KUNKLE
BY
Spencer, Hardman & Fehr
his ATTORNEYS Patented June 2, 1936

2,042,666

UNITED STATES PATENT OFFICE 2,042,666

MOTOR MOUNT

Bayard D. Kunkle, Detroit, Mich., assignor to General Motors Corporation, Detroit, Mich., a corporation of Delaware Application August 22, 1934, Serial No. 740,933

8 Claims. (Cl. 248—26)

This invention relates to motor mounts, and more particularly to motor mounts adapted to support electric motors of a domestic mechanical refrigeration unit or the like.

An object of the invention is the provision of the motor mount to reduce or eliminate vibrations and noise incident to the operation of the electric motor.

Another object of the present invention is to provide improved means for yieldably supporting a motor housing which will be cheap and simple in its construction, inexpensive to install, compact in arrangement and which will not detract from the appearance of the motor as a whole, and permit the motor to be mounted in or removed from the support easily and quickly.

Further objects and advantages of the present invention will be apparent from the following description, reference being had to the accompanying drawing wherein a preferred embodiment of the present invention is clearly shown.

In the drawing:

Fig. 1 is a side elevational view of the motor mount embodying the present invention.

Fig. 2 is an end view of the motor mount looking in the direction of arrow 2 in Fig. 1.

Fig. 3 is a fragmentary sectional view of the motor mount with the motor removed.

Fig. 4 is a sectional view taken on the line 4—4 of Fig. 3.

Fig. 5 is a collective perspective view showing a fragment of the motor housing provided with a projecting boss, the cushioning block, the split ring and a fragment of a support.

Fig. 6 is a fragmentary end view of the motor mount, showing a slight modification, embodying the present invention.

Fig. 7 is a sectional view taken on the line 7—7 of Fig. 6.

Referring to the drawing, an electric motor 20 of small or fractional horse power and of any suitable type comprises a frame 21 and end members 22, each end member having a flat external surface 23 with a bearing member or boss 24 of non-circular formation projecting therefrom. These bosses 24 may be formed integral with the end members 22 and extend axially thereof. The bosses provide journals for an armature shaft 25 and are adapted to fit within a cushioning block 26, preferably of soft rubber or its equivalent. Each block is provided with an opening 27 similar to the periphery of the bosses 24. Each block is provided with a main body portion 28 having side walls 29 inclined toward each other and a flange 30, the outer surface of each flange adapted to engage the flat surface 23 of each end member.

A metallic split ring or band 35, preferably of one piece and of flat steel, is adapted to fit about the main body portion 28 of the block 26 and which has side walls 36, inclined toward each other, a top wall 37 and a split-bottom wall or base 38. Each of the side walls 36 is provided with an opening 39, while the ends 38 forming the bottom wall are provided with opposed notches 40.

The motor 20 is adapted to be mounted upon a support so that the transmission of noise and vibration will be substantially eliminated or reduced to a minimum. The support is preferably constructed of sheet metal of U-shaped formation, and comprises a bottom 43 and two upwardly extending arms 44. The arms 44 are formed with tapered notches 45 which include a pair of tongues or projections 46 and a tongue or projection 47 extending upwardly from the bottom of the recess 45. Within the notches 45 the bosses 24 together with the cushioning block 26 and the split-ring 35 are adapted to be yieldingly supported.

In mounting the motor 20 upon the support 42, the cushioning block 27 is first slipped over each one of the bosses 25 so that the outer surface of the flange 30 of each block is adjacent the flat surface 23 of the end members. The split-ring 37 is then placed over the main body portion 28 of the cushioning block 26. When the housing 20 is lowered into the notches 45 of the arms 44, the side walls 36 of the ring, due to the split-base 38, will be urged toward each other and compress the block firmly against the boss. When the tongues 46 register with their respective opening 39, the tongue 47 will also be interposed between the opposed notches 40 provided by the ends of the split-base 38. As soon as the tongues 46 register with their respective openings 39 the side walls 36 will spring outwardly, due to their own resiliency and the elasticity of the block 26, toward their normal position. Thus the ring is locked in position within the notch 45 and the cushioning blocks are held substantially against movement with respect to the ring as the outer surfaces of the main body portion of the cushioning block are held against the inner surface of the ring. Also the block 27 is held against a turning movement relative to the boss 25 by the ring 37. Therefore, only a slight rotary movement of the motor relative to the blocks is permitted due to the elasticity of the cushioning block. The tongues 46 and 47 have a close fit within their respective notches 39, therefore the housing can have only a slight vibratory movement in an axial direction and only to the extent of the yieldability of the flange 30 which is interposed between the ring 27 and the flat surface 23. The tongues 46 also prevent the ring from turning relative to the support by reason of the lower edge of each tongue 46 is in engagement with the adjacent edge of the opening 39 and since each block is held against turning movements by reason of its shape corresponding to shape of the ring, therefore only slight turning movements permitted by the yieldability of the block can be imparted to the housing. Thus the housing is yieldably supported by the cushioning blocks and is permitted to have gyratory and vibratory movements in any direction, and since the block cannot allow these movements to be transmitted to the standard or supporting structure, the operation of the motor is smooth and quiet.

When it is desired to disassemble the motor from the support 42 a suitable tool capable of urging the side walls 36 toward each other until the lower edges of the tongues 46 are clear of the openings 39 so as to allow the motor to be lifted slightly and permit the lower portion of the tongues 46 to ride on the surface of the side walls 36. When this occurs the motor can then be lifted from the notches.

It will be apparent that present invention provides for a simple and inexpensive mounting for electric motors upon which the motor may be quickly and firmly secured upon a supporting member without the use of bolts or screws and which can be easily removed. The present construction permits small gyratory and vibratory movements but prevents transmission of the vibrations to the supporting construction, thus reducing the wear on the armature shaft bearing and insuring a smooth and quiet motor during its operation.

In case the motor 21 and the support 43 are to be used upon a construction which requires that the motor and the support be suspended in a position upside down from the position shown in Figs. 1 and 2, a locking key or clip 50 is used, see Figs. 6 and 7. The key 50 is provided with a U-shaped end 51 adapted to fit over the projections 47 of the arms 44. The key 50 is pressed between the two ends 38 of the band 37 and the hooked end 51 is maintained in position over the projections 47 by the rubber block 26. The edges of the ends 38, located on each side of the slot 40, engage the side edges of the key 50, thus the side walls 36 of the band are prevented from coming toward each other and allowing slots 39 to become disengaged from the projections 46.

While the embodiment of the present invention as herein disclosed, constitutes a preferred form, it is to be understood that other forms might be adopted, all coming within the scope of the claims which follow.

What is claimed is as follows:

1. In a device of the character described, the combination comprising; a bearing member of non-circular formation in cross section; a shaft journaled in the bearing member; a cushioning block having an aperature of non-circular formation in which the bearing member fits; a split-ring about the cushioning block; and a supporting member having a recess open at one side in which the split-ring fits, said ring and support having provisions cooperating with each other for retaining the ring within the recess.

2. In a device of the character described, the combination comprising; a housing provided with a projecting boss of non-circular formation; a shaft journalled in the boss; a cushioning member provided with a flange about the boss; a split ring arranged about the cushioning member so that the flange is adjacent a shoulder of the housing; and a supporting member having a notch at one side to receive the ring and cause same to hold the cushioning member about the boss whereby the flange of the cushioning member will permit slight movement of the housing in an axial direction.

3. In a device of the character described, the combination comprising; a frame having a bearing member of non-circular formation in cross-section; a shaft journaled in the bearing member; a rubber bushing having an opening complementary to the external surfaces of the bearing member, said bushing having exterior side walls inclined toward each other; a metallic split-ring complementary to the exterior surface of the bushing, said ring having openings in the side walls and a pair of opposed notches at its ends thereof; a standard having a tapered notch provided with a plurality of inwardly projecting tongues, said notch adapted to receive the ring and urge the side walls thereof toward each other to compress the bushing about the bearing, the openings and notches of the ring receiving respective tongues within the notch for retaining the ring therein whereby said bushing will absorb the torsional vibrations of the frame.

4. In a device of the character described, the combination comprising; a frame having a bearing member of non-circular form in cross-section; a shaft journaled in the bearing member; a rubber bushing having an opening complementary to the external surfaces of the bearing member, said bushing having exterior side walls inclined toward each other; a metallic split-ring substantially complementary to the exterior surface of the bushing, said ring having openings in the side walls and a pair of opposed notches at the ends thereof; a support having a tapered recess on one side provided with a plurality of inwardly projections, said recess adapted to receive the ring to compress the bushing about the bearing whereby the bushing will absorb the torsional vibrations of the bearing and allow the openings and notches of the ring to receive the respective projections within the recess and means for locking the ring within the recess.

5. In a device of the character described, the combination comprising; a bearing member; a shaft journaled in the bearing member; a cushioning block having an aperture in which the bearing member fits; a split-ring about the cushion block; a supporting member having a recess open at one side in which the split-ring fits, said ring and support having provisions cooperating with each other to prevent axial movement of the split-ring relative to the support; and a key for maintaining the ring within the recess of the support.

6. In a device of the character described, the combination comprising; a bearing member of non-circular formation in cross section; a shaft journaled in the bearing member; cushioning means for the bearing member; a band provided with a plurality of openings and placed about the cushioning means; and a supporting member having a recess open at one side and provided with spaced projections, said recess adapted to receive and yieldingly hold the band, and said recess causing the band to clamp the cushioning means about the bearing member and said projections registering with and extending into the openings of the band for limiting vertical and endwise movements of the same relative to the support, whereby the cushioning member will absorb the torsional vibrations of the bearing member.

7. In a device of the character described, the combination comprising; a housing; a bearing member of non-circular formation attached to the housing; a shaft journaled in the bearing member; a cushioning block for the bearing member; a deformed metal strap having a plurality of recesses and placed about the cushioning block; a supporting member having a tapered notch on one side thereof to receive the strap and compress the cushioning block in a non-rotatable relation with respect to the bearing member; and means carried by the supporting member cooperating with the recesses of the strap to yieldingly hold the strap within the notch of the supporting member.

8. In a device of the character described, the combination comprising; a bearing member of non-circular formation; a shaft journaled in the bearing member; a cushioning block for the bearing member; a deformed metal strap having a plurality of openings; a standard having a notch on one side into which the strap may be lowered and compress the cushioning block against the bearing member; and means projecting from the standard and cooperating with the openings in the strap for yieldingly holding the strap within the notch of the standard.

BAYARD D. KUNKLE.